US006978287B1

(12) United States Patent
Langhammer

(10) Patent No.: US 6,978,287 B1
(45) Date of Patent: Dec. 20, 2005

(54) DSP PROCESSOR ARCHITECTURE WITH WRITE DATAPATH WORD CONDITIONING AND ANALYSIS

(75) Inventor: Martin Langhammer, Dorset (GB)

(73) Assignee: Altera Corporation, San Jose, CA (US)

( * ) Notice: Subject to any disclaimer, the term of this patent is extended or adjusted under 35 U.S.C. 154(b) by 765 days.

(21) Appl. No.: 09/826,527

(22) Filed: Apr. 4, 2001

(51) Int. Cl.$^7$ .............................................. G06F 7/38
(52) U.S. Cl. ..................................................... 708/230
(58) Field of Search ............................... 708/230, 231, 708/233; 326/37–38

(56) References Cited

U.S. PATENT DOCUMENTS

| | | | |
|---|---|---|---|
| 3,473,160 A | 10/1969 | Wahlstrom | 340/172.5 |
| 4,871,930 A | 10/1989 | Wong et al. | 307/465 |
| 4,912,345 A | 3/1990 | Steele et al. | 307/465 |
| 5,122,685 A | 6/1992 | Chan et al. | 307/465.1 |
| 5,128,559 A | 7/1992 | Steele | 307/465 |
| 5,262,974 A * | 11/1993 | Hausman et al. | 708/493 |
| 5,371,422 A | 12/1994 | Patel et al. | 326/41 |
| 5,483,178 A | 1/1996 | Costello et al. | 326/41 |
| 5,689,195 A | 11/1997 | Cliff et al. | 326/41 |
| 5,754,459 A | 5/1998 | Telikepalli | 364/759 |
| 5,825,202 A | 10/1998 | Tavana et al. | 326/39 |
| 5,874,834 A | 2/1999 | New | 326/39 |
| 6,069,487 A | 5/2000 | Lane et al. | 326/37 |
| 6,209,017 B1 * | 3/2001 | Lim et al. | 708/552 |
| 6,215,326 B1 | 4/2001 | Jefferson et al. | 326/41 |
| 6,441,842 B1 * | 8/2002 | Fandrianto et al. | 348/14.13 |
| 6,519,620 B1 * | 2/2003 | Nguyen et al. | 708/552 |
| 6,597,394 B1 * | 7/2003 | Duncan et al. | 348/222.1 |
| 2002/0061012 A1 * | 5/2002 | Thi et al. | 370/352 |

FOREIGN PATENT DOCUMENTS

| | | | |
|---|---|---|---|
| EP | 0 461 798 A2 | 12/1991 | H03K 19/177 |
| GB | 2 283 602 A | 5/1995 | H03K 19/177 |

OTHER PUBLICATIONS

A. Chhabra and R. Iyer, "A Block Floating Point Implementation on the TMS320C54x DSP", Application Report SPRA610, Texas Instruments, Dec. 1999, pp. 1-10.
The Applications Engineering Staff of Analog Devices, DSP Division, *Digital Signal Processing Applications Using the ADSP-2100 Family* (edited by Amy Mar), Prentice-Hall, Inc., Englewood Cliffs, NJ, Copyright 1990 by Analog Devices, Inc., Norwood, MA, pp. 141-192.
"TMS320C54x DSP Reference Set, vol. 1: CPU and Peripherals", Literature No.: SPRU131F, Texas Instruments, Apr. 1999, pp. 2-1 through 2-16 and 4-1 through 4-29.
U.S. Appl. No. 09/124,649, filed Jul. 29, 1998, Ngai et al.
U.S. Appl. No. 09/389,995, filed Sep. 2, 1999, Heile.
U.S. Appl. No. 09/516,921, filed Mar. 2, 2000, Ngai et al.

(Continued)

*Primary Examiner*—Tan V. Mai
(74) *Attorney, Agent, or Firm*—Fish & Neave IP Group of Ropes & Gray LLP; Robert R. Jackson; Hassan Albakri

(57) ABSTRACT

An improved digital signal processing (DSP) processor architecture is presented in which word conditioning (e.g., rounding, saturation, etc.) and analysis operations (e.g., block floating point analysis) are implemented in the write datapath to memory. By moving word conditioning operations from the critical path to the write datapath, the throughput of common DSP functional blocks such as multiplier-accumulator (MAC) blocks may be improved. Delays may be further reduced by combining analysis operations with write or move operations.

34 Claims, 8 Drawing Sheets

OTHER PUBLICATIONS

U.S. Appl. No. 09/924,354, filed Aug. 7, 2001, Langhammer et al.
U.S. Appl. No. 09/955,645, filed Sep. 18, 2001, Langhammer et al.
U.S. Appl. No. 09/969,977, filed Oct. 2, 2001, Langhammer.
"Implementing Multipliers in FLEX 10K EABs", Technical Brief 5, Altera Corporation, Mar. 1996.
"Xilinx Unveils New FPGA Architecture to Enable High-Performance, 10 Million System Gate Designs", Xilinx Virtex-II Architecture Technology Backgrounder, Xilinx Inc., Jun. 22, 2000, pp. 1-9.
"Xilinx Announces DSP Algorithms, Tools and Features for Virtex-II Architecture", Xilinx Inc., Nov. 21, 2000, pp. 1-4.
"Virtex-II 1.5V Field-Programmable Gate Arrays", Advance Product Specification, DS031-2 (v1.3), Xilinx Inc., Jan. 25, 2001, Module 2 of 4, pp. 1-50.
"Virtex-II 1.5V Field-Programmable Gate Arrays", Advance Product Specification, DS031-1 (v1.5), Xilinx Inc., Apr. 2, 2001, Module 1 of 4, pp. 1-7.
"Virtex-II 1.5V Field-Programmable Gate Arrays", Advance Product Specification, DS031-2 (v1.5), Xilinx Inc., Apr. 2, 2001, Module 2 of 4, pp. 1-36.

* cited by examiner

DSP PROCESSOR ARCHITECTURE WITH WRITE DATAPATH WORD CONDITIONING AND ANALYSIS

BACKGROUND OF THE INVENTION

This invention relates to digital signal processing (DSP), and more particularly to architectural considerations relating to word conditioning and analysis operations for DSP processors.

In conventional DSP processor architectures, logic for performing word conditioning operations (e.g., rounding, saturation, etc.) is typically included in substructures such as arithmetic logic units (ALUs) and accumulators. As a result, the delays associated with propagating signals through word conditioning logic often appear in the critical paths of functional blocks (e.g., multiplier-accumulator (MAC) blocks) that use such substructures. If analysis operations are also required, a further delay could be introduced before the output of a given functional block may be available for use by other functional blocks or subsystems. For example, in block floating point analysis, additional instructions are usually required to perform this analysis in a separate functional block.

The above-described delays which appear in the critical paths in conventional DSP processor architectures are especially pronounced in "soft logic" implementations, such as those on programmable logic devices, wherein word conditioning operations are implemented by logic that is multiple levels deep, thereby incurring considerable propagation delay. These delays may be further compounded by inefficient arrangements for performing analysis operations.

SUMMARY OF THE INVENTION

The present invention relates to an improved DSP processor architecture in which word conditioning and analysis operations are implemented in the write datapath to memory. By moving word conditioning operations from the critical path to the write datapath, this improved architecture enhances the throughput of common DSP functional blocks such as MAC blocks. Delays may be further reduced by combining analysis operations with write operations.

Further features of the invention, its nature and various advantages will be more apparent from the accompanying drawings and the following detailed description of the invention.

DETAILED DESCRIPTION OF THE INVENTION

Figure 1A:
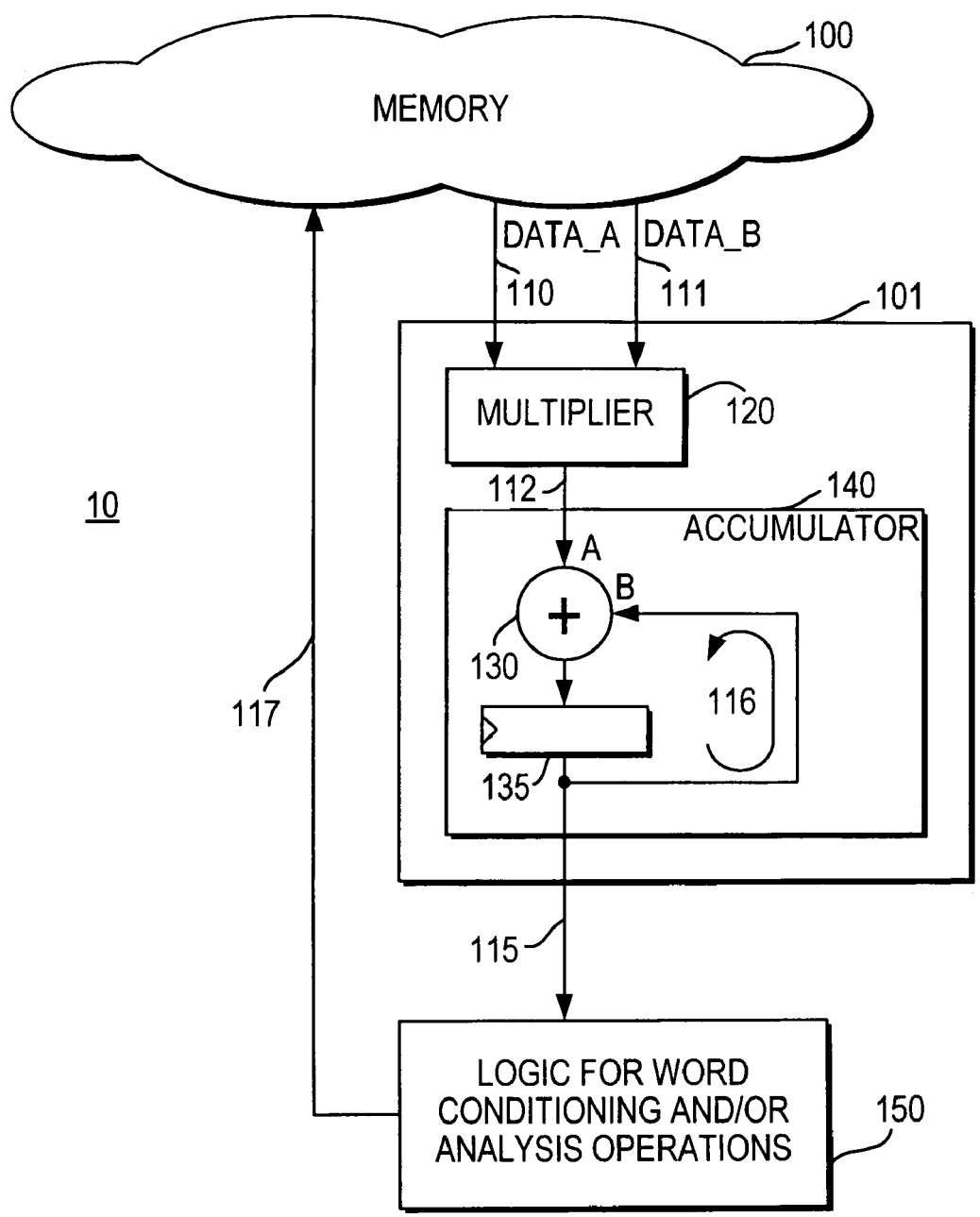
FIG. 1a is a simplified block diagram of a DSP subsystem which may be implemented in accordance with the principles of the present invention.
Figure 2:
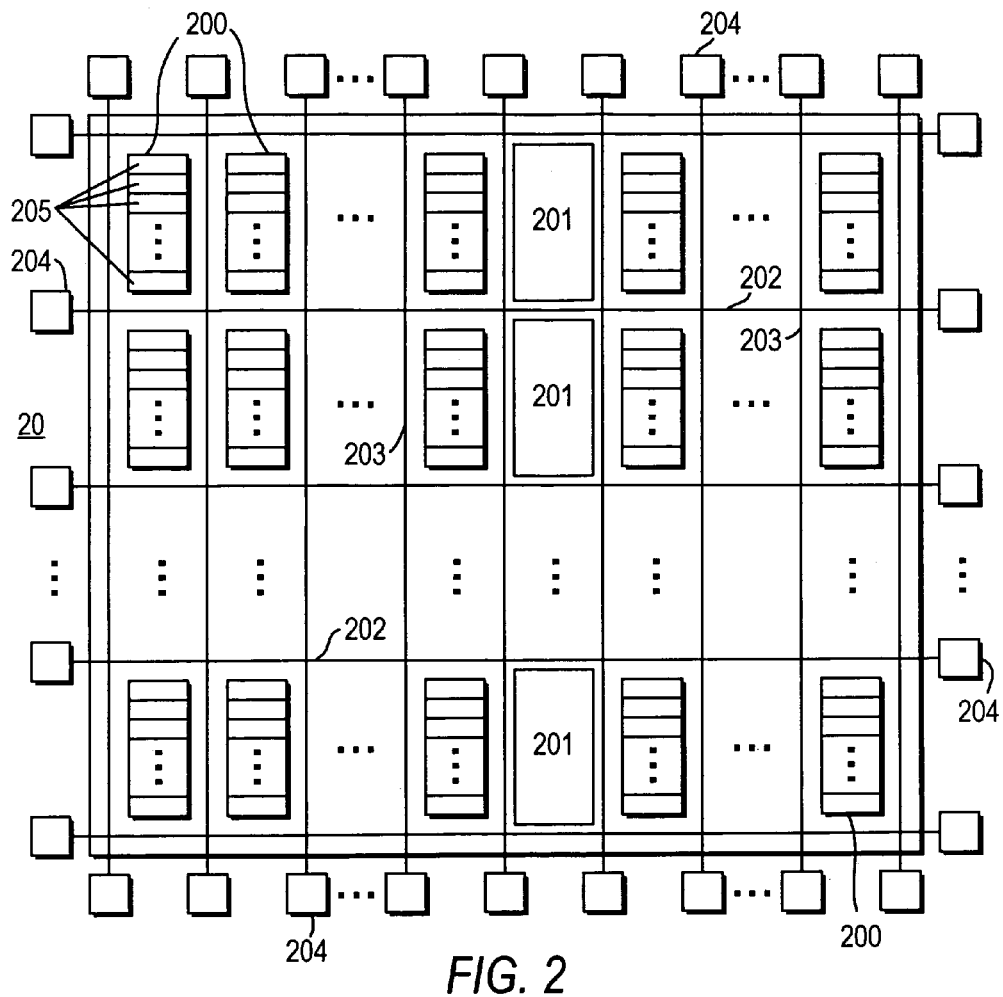
FIG. 2 is a simplified block diagram of a programmable logic device on which an improved DSP processor architecture may be implemented in accordance with the principles of the present invention.

FIG. 1a illustrates a DSP subsystem 10 that has been improved in accordance with the principles of the present invention. DSP subsystem 10 may be implemented on any of a variety of integrated circuit devices. For example, subsystem 10 may be part of a reprogrammable DSP processor architecture implemented on a programmable logic device 20, such as the one shown in FIG. 2. In programmable logic device 20, subsystem 10 may be implemented by a group of programmable logic regions 200 and/or special function blocks 201 (e.g., hardware multipliers, memory, etc.).

As shown in FIG. 1a, subsystem 10 includes a functional block 101 which, for the purpose of illustrating the principles of the present invention, is a MAC block containing a multiplier 120 and an accumulator 140. Subsystem 10 also includes a second functional block 150 containing logic for performing word conditioning and/or analysis operations. Subsystem 10 receives data from and writes data to a memory structure 100, which, for the purposes of the present invention, may be any of a variety of memory structures of different types and sizes: memory 100 may be static memory, dynamic memory, a register file, single-port memory, multi-port memory, a single memory block, a plurality of memory blocks, or a combination of such memory structures, which may be located in different parts of the integrated circuit on which subsystem 10 is implemented.

For the purpose of illustrating the principles of the present invention, the flow of data within subsystem 10 may be briefly described as follows: multiplier 120 within MAC block 101 receives DATA_A and DATA_B on data input lines 110 and 111, respectively. The output of multiplier 120 is then provided as an input to accumulator 140, which is functionally represented in FIG. 1a as including an adder 130 and a register 135. As shown in FIG. 1a, adder 130 and register 135 are arranged such that the "A" input of adder 130 may be added or subtracted, in an iterative loop, to a previous result of adder 130 stored in register 135, which may be provided as the "B" input to adder 130 via feedback path 116. Upon termination of the iterative loop (if any), the output of MAC block 101 on data lines 115 is then provided to functional block 150 for word conditioning and/or analysis operations. The output of functional block 150 may then be written to memory 100 via datapath 117.

Figure 1B:
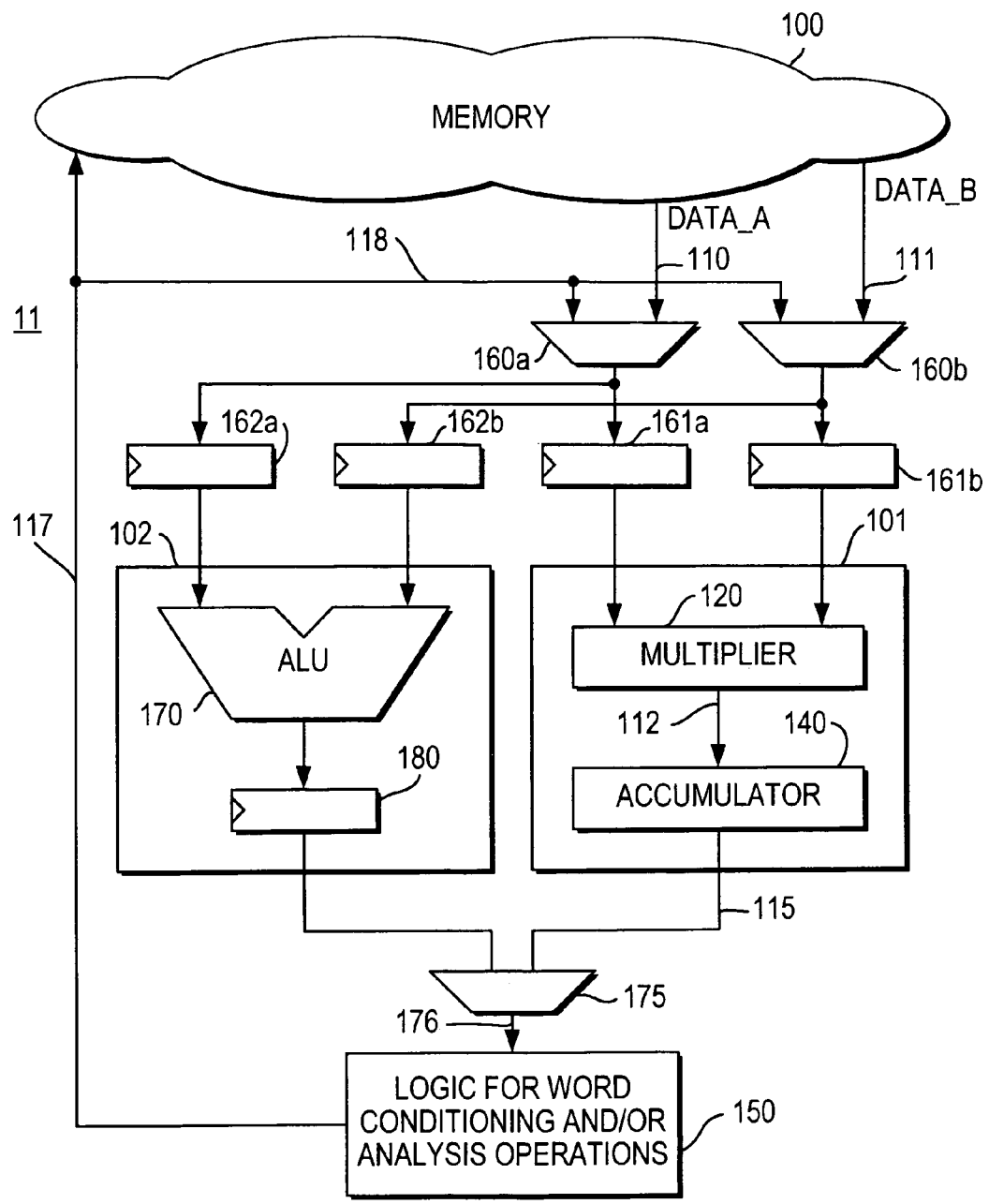
FIG. 1b is a simplified block diagram of another DSP subsystem which may be implemented in accordance with the principles of the present invention.

An alternative embodiment of subsystem 10 is shown in FIG. 1b as subsystem 11, in which a functional block 102, which contains an ALU 170 and a register 180, may be used to perform operations in parallel with MAC block 101. For the purposes of the present invention, the write operations mentioned herein are not limited to writing back to memory 100. For example, a write operation in subsystem 11 may be a register-to-register move operation, in which the conditioned output of either register 135 (in accumulator 140—see FIG. 1a) or register 180 may be applied on write datapath 117/118 to be fed back to any of input registers 161a/161b/162a/162b.

Unlike conventional DSP processor architectures, word conditioning operations in subsystems 10/11 are not executed in accumulator 140 or in ALU 170. Instead, such operations are performed in functional block 150 in order to decrease the propagation delay through functional blocks 101/102. Because the logic for performing word conditioning is often multiple levels deep, the propagation delay through such logic may be substantial even when word conditioning is not being performed. Thus, by moving word conditioning logic out of accumulator 140 and ALU 170, the propagation delay incurred as a result of passing through such logic is eliminated from the critical path in functional blocks 101/102. When word conditioning logic is taken out of a substructure that includes, or is part of, a feedback loop (e.g., accumulator 140), the cumulative reduction in propagation delay may be substantial depending on the number of iterations.

Because there is more timing slack in the write datapath 117 back to memory 100, performing word conditioning and analysis operations in the write datapath 117 via functional block 150 allows the throughput of subsystems 10/11 to be increased as a result of shifting the delay from the critical path to the write datapath. In accordance with the principles of the present invention, the types of word conditioning operations which may be performed in functional block 150 are preferably those that can be deferred for execution on the output of functional block 101/102 because they do not affect the intermediate values generated within functional block 101/102.

Figure 3:
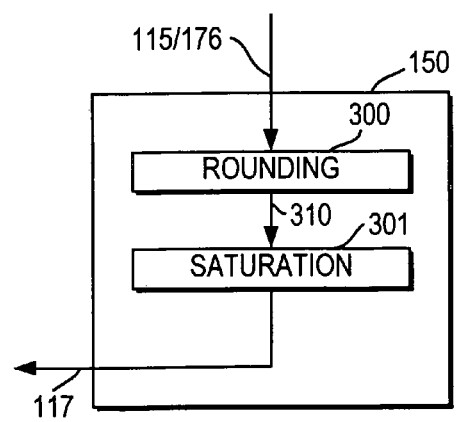
FIG. 3 is a simplified block diagram showing one possible embodiment of a functional block shown in FIGS. 1a and 1b.

Among the word conditioning operations which may be performed within functional block 150 in accordance with the principles of the present invention are rounding and saturation, as shown in FIG. 3. In the embodiment of functional block 150 shown in FIG. 3, the output of functional block 101/102 on lead 115/176 is passed through rounding logic 300 and saturation logic 301 prior to being applied on the write datapath 117. In accordance with the principles of the present invention, unless rounding is a necessary operation for accurately generating intermediate results within a given functional block, rounding logic 300 may be moved out of substructures such as accumulator 140 and ALU 170, such that it may be executed outside of the critical path of that functional block.

Figure 4:
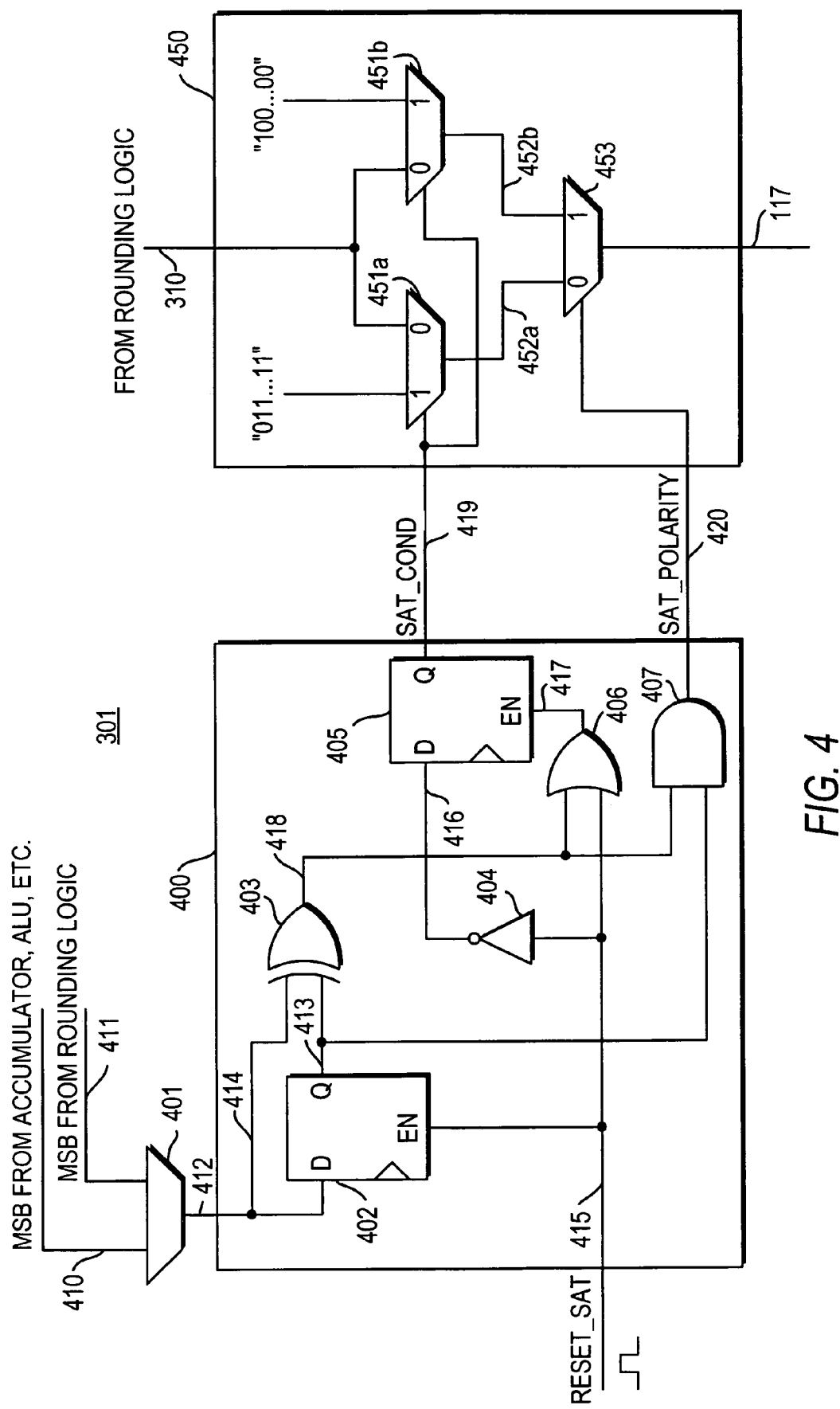
FIG. 4 is a simplified block diagram showing a portion of FIG. 3 in greater detail.

Similarly, saturation logic 301 may also be moved out of substructures such as accumulator 140 and ALU 170 and into a separate functional block 150. As shown in FIG. 4, saturation logic 301 may include a subcircuit 400 that checks for saturation, and a second subcircuit 450 that is used to apply a saturation value ("011 . . . 11" for positive saturation; "100 . . . 00" for negative saturation) on the write datapath 117 when saturation occurs. For the purposes of the present invention, saturation logic 301 may function as follows: when an initial value is loaded into a substructure that is be to monitored for saturation (e.g., accumulator 140, ALU 170, etc.), RESET_SAT is briefly asserted logic HIGH, which results in the most significant bit (MSB) of that initial value to be held on lead 413. While the substructure is in operation, subcircuit 400 monitors whether a saturation condition exists by comparing the MSB of the current value stored in the substructure, which is provided on lead 410, with the saved sign bit on lead 413. Because saturation may also occur as a result of rounding, subcircuit 400 also monitors the MSB of the output of rounding logic 300. When the MSB of either the current value stored in the substructure or the output of rounding logic 300 no longer corresponds to the saved sign bit, SAT_COND and SAT_POLARITY on leads 419 and 420, respectively, are each set to a logic state such that the appropriate saturation value ("011 . . . 11" or "100 . . . 00") is passed to the write datapath 117. Otherwise, when a saturation condition does not exist, the output of rounding logic 300 is passed to the write datapath 117.

Figure 5A:
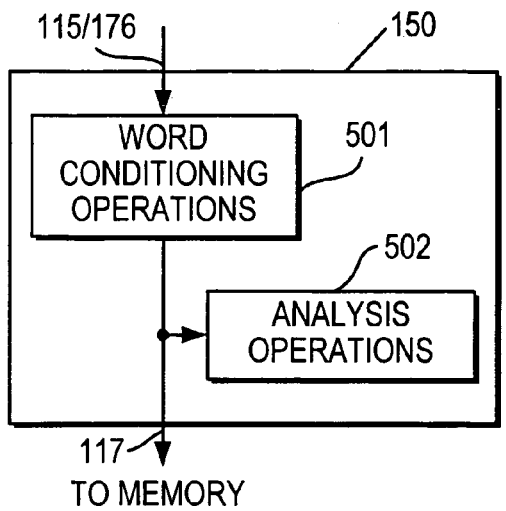
FIGS. 5a–5d are simplified block diagrams of possible alternative embodiments of a functional block shown in FIGS. 1a and 1b.
Figure 5B:
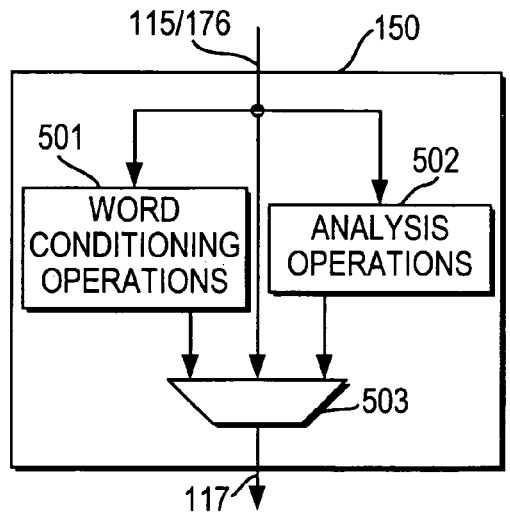
Figure 5C:
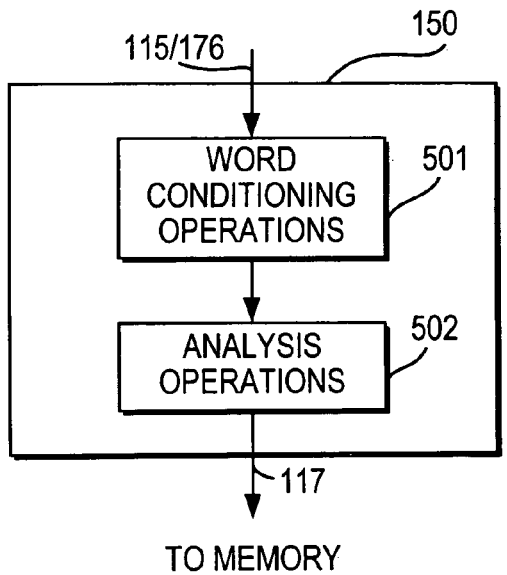
Figure 5D:
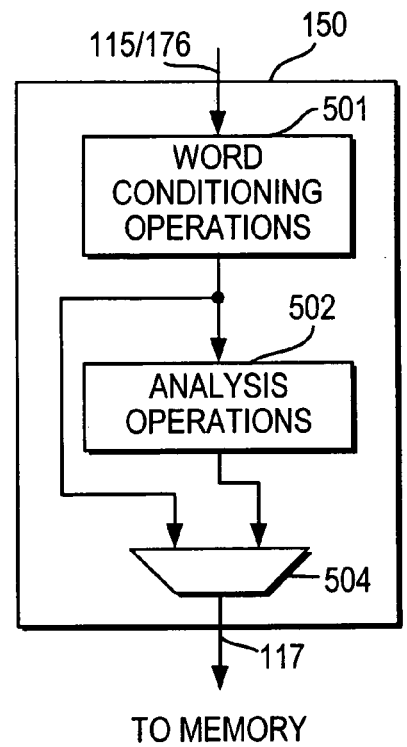

For the purposes of the present invention, functional block 150 may contain any of a variety of arrangements for performing word conditioning and/or analysis operations, as illustrated in FIGS. 5a–5d. As shown in FIG. 5a, for example, functional block 150 may be configured such that the output of functional block 101/102 is first modified by a set of word conditioning operations, and then written to memory 100, while analysis operations are performed in parallel. Alternatively, as shown in FIG. 5b, functional block 150 may be configured to allow the selection of a specific word conditioning or analysis operation (or neither) to be performed on the output of functional block 101/102. Another possible embodiment of functional block 150 is shown in FIG. 5c, in which several word conditioning and/or analysis operations may be performed serially prior to writing back to memory 100. A variation of the embodiment of FIG. 5c is shown in FIG. 5d, in which specific operations in a serial chain of word conditioning and/or analysis operations may be selectively bypassed.

For the purposes of the present invention, further alternative embodiments of functional block 150 may be created by combining the embodiments shown in FIGS. 5a–5d, in whole or in part. Moreover, the specific number and the particular arrangement of word conditioning and analysis operations as illustrated in each of FIGS. 5a–5d is by no means determinative and may be modified to suit any given application.

In addition to moving word conditioning operations to the write datapath, the throughput of a DSP subsystem may also be increased by combining analysis operations with write operations to decrease the number of processor cycles required to execute a set of complex operations. For example, in Fast Fourier Transform (FFT) computations, the combination of block floating point analysis with write (or move) operations may reduce processing times by twenty percent.

Figure 6:
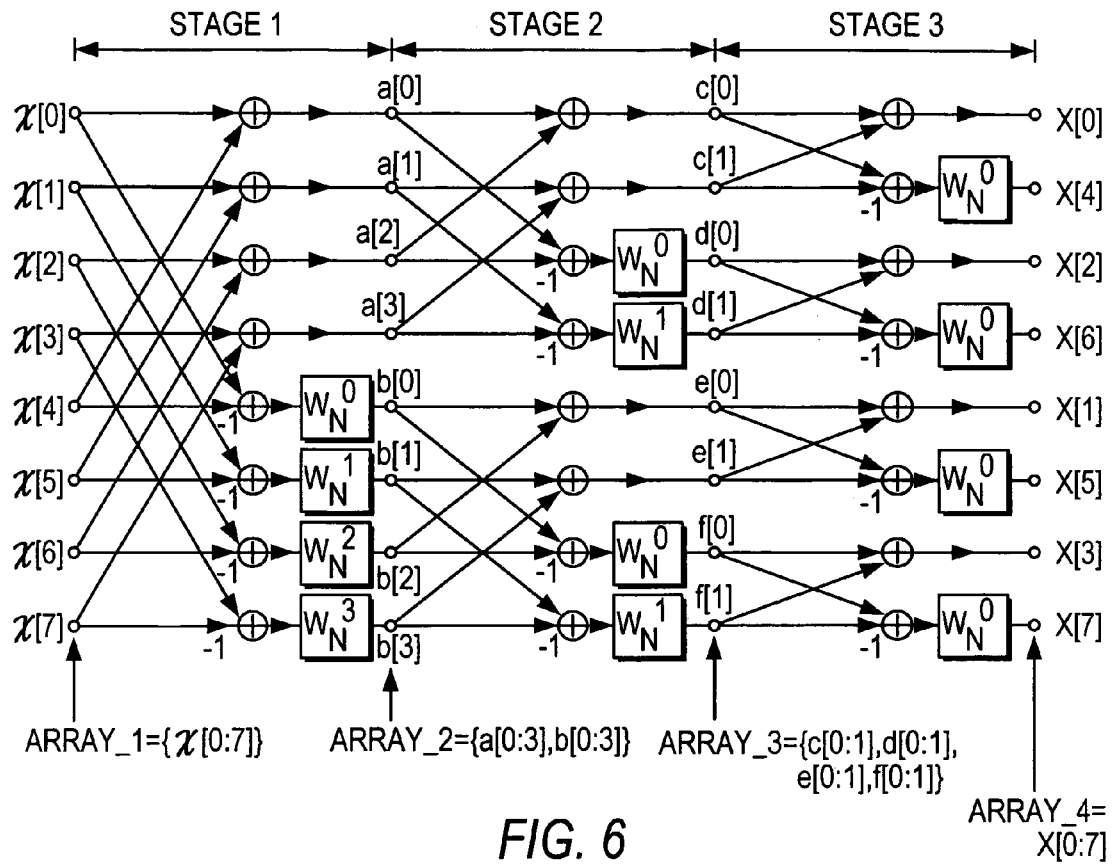
FIG. 6 is a simplified flow graph showing how a Fast Fourier Transform may be computed.

To illustrate how an FFT computation may be performed in accordance with the principles of the present invention, FIG. 6 shows a flow graph of a decimation-in-frequency decomposition of an 8-point FFT for an input sequence, x[0:7], which is an array of eight 16-bit words. (The specific word lengths and array sizes mentioned herein and shown in the figures are being used only by way of example. The principles of the present invention are readily applicable to any of a variety of different word lengths, array sizes, and combinations thereof.) The flow graph indicates that this particular FFT computation may take place in three stages, wherein the different arrays that are processed and/or generated by each stage are designated as ARRAY_1 (the input sequence, x[0:7]), ARRAY_2 (the intermediate results generated in STAGE 1), ARRAY_3 (the intermediate results generated in STAGE 2), and ARRAY_4 (the FFT of x[0:7], as generated in STAGE 3).

Figure 7:
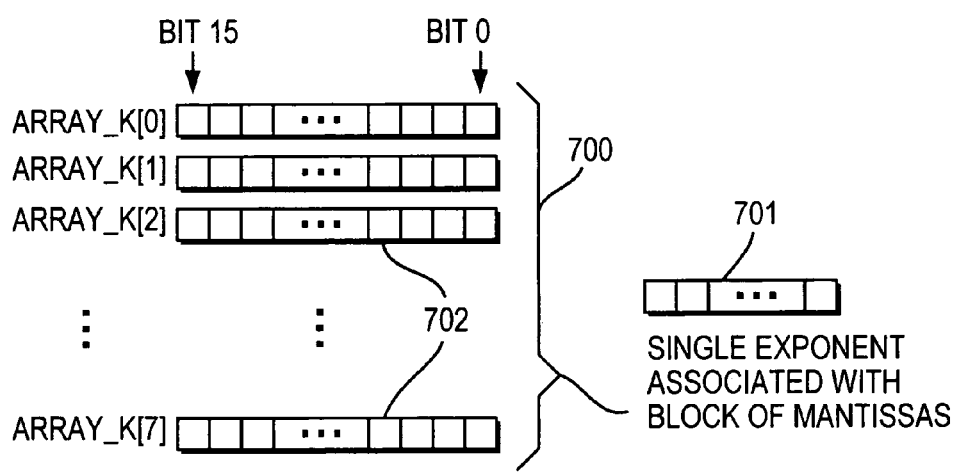
FIG. 7 is a simplified illustration of a data structure referred to in the flow graph of FIG. 6.

For the purpose of illustrating the principles of the present invention, each array, represented generically as ARRAY_K in FIG. 7, is expressed in block floating point format such that each word 702 within the array 700 represents a specific mantissa that is scaled by a common exponent 701 that is applied to all words 702 in the associated array 700. In order to preserve the dynamic range or to normalize the resolution of the values within the array 700 after a series of computations (e.g., to avoid overflow), the common exponent 701 may be checked and, if necessary, adjusted to uniformly shift all the words in the array 700 accordingly. Specifically, each mantissa is analyzed by a block floating point analysis unit to determine whether the common exponent should be updated. After all of the mantissas in the array 700 have been analyzed, the associated common exponent 701 is then calculated and/or updated based upon the largest mantissa.

Figure 8:
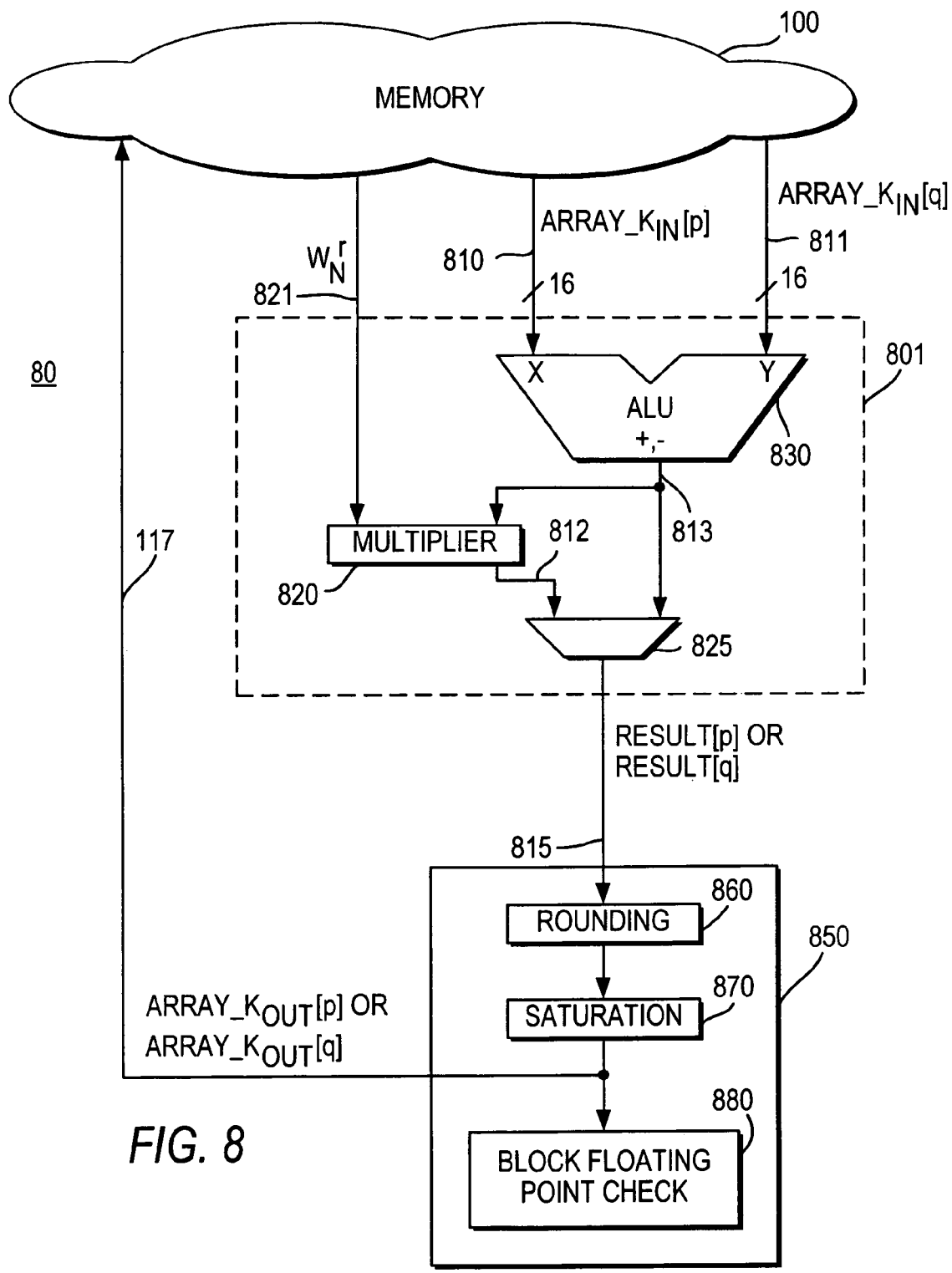
FIG. 8 is a simplified block diagram of another DSP subsystem that has been improved in accordance with the principles of the present invention.

The FFT computation represented by the flow graph of FIG. 6 may be carried out in accordance with the principles of the present invention by subsystem 80 shown in FIG. 8. When an FFT computation is performed in subsystem 80, ARRAY_2, ARRAY_3, and ARRAY_4 may each be generated a word at a time by functional unit 801, which, in the embodiment shown in FIG. 8, is configured to execute one-half of a butterfly calculation (see FIG. 9) in a single pass. (In other embodiments of functional block 801, a full butterfly calculation may be performed in a single pass, during which the upper and lower halves are computed in parallel.)

Figure 9:
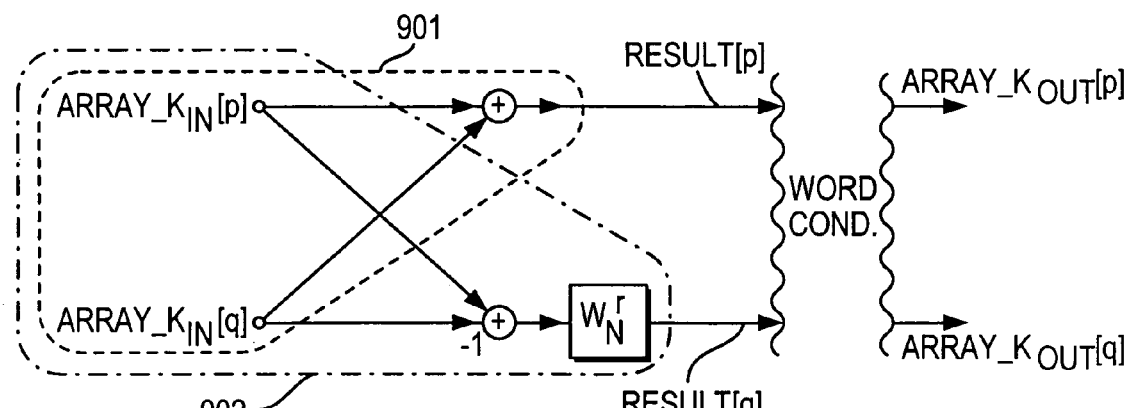
FIG. 9 shows an aspect of FIG. 6 in greater detail.

A generalized butterfly calculation that may be performed by subsystem 80 is illustrated in FIG. 9. In FIG. 9, ARRAY_$K_{IN}$ represents an input array to a given stage (e.g., STAGE 1, STAGE 2, STAGE 3) and ARRAY_$K_{OUT}$ represents the output of the butterfly calculations performed in that stage. As mentioned previously, the embodiment of functional unit 801 shown in FIG. 8 calculates one-half of a butterfly in a single pass. For example, functional block 801 may first calculate the upper-half of the butterfly shown in FIG. 9, which is enclosed by dotted lines 901. Turning briefly to FIG. 8, the result of this calculation, RESULT[p], is first processed by rounding logic 860 and then by saturation logic 870 to produce a result, ARRAY_$K_{OUT}$[p], which is then written to memory. In combination with the memory-write operation, a block floating point check 880 may be performed. For the computations associated with the lower-half of the butterfly (shown in FIG. 9 as being enclosed by dotted-dashed line 902), similar procedures are performed. When all butterfly calculations are completed for a given stage, the results of the block floating point check for each word in ARRAY_$K_{OUT}$[0:7] are then used to update the common exponent associated with ARRAY_$K_{IN}$[0:7], which may then be used as the common exponent for ARRAY_$K_{OUT}$[0:7]. Then, every word in ARRAY_$K_{OUT}$[0:7] may be shifted in accordance with this updated common exponent, which may be accomplished by a software loop that loads each element in the array, shifts it, and stores it back.

Figure 10:
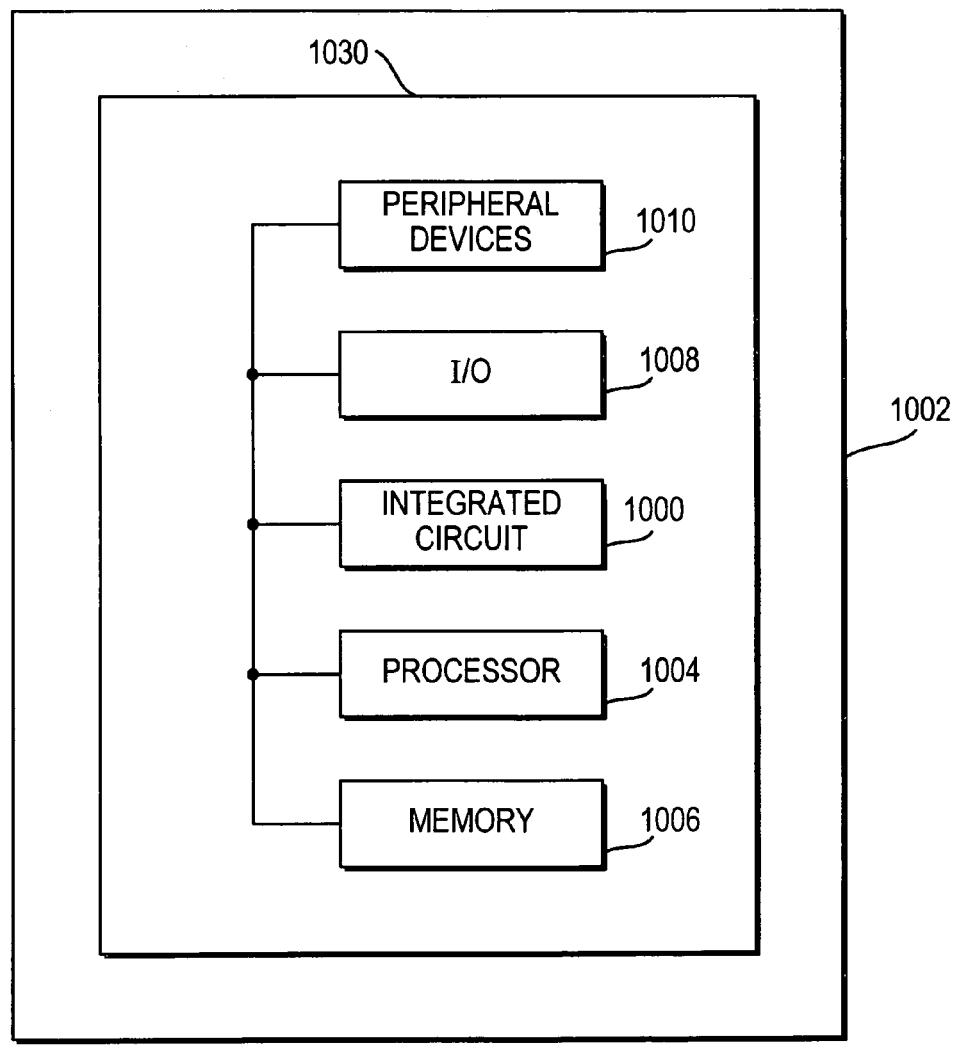
FIG. 10 is a simplified block diagram of an illustrative system employing an integrated circuit, in which the improved DSP processor architecture presented herein is implemented in accordance with the principles of the present invention.

FIG. 10 shows a system 1002 having an integrated circuit 1000, in which the improved DSP processor architecture presented herein is implemented in accordance with the principles of the present invention. System 1002 can be used in a wide variety of applications such as computer networking, data networking, instrumentation, video processing, or any other application where the advantage of having an improved DSP processor architecture is desirable. Integrated circuit 1000, in which the improved DSP processor architecture presented herein is implemented in accordance with the principles of the present invention, can be a programmable logic device, such as device 20 shown in FIG. 2, which may be used to perform a variety of different logic functions. For example, integrated circuit 1000 can be configured as a processor or as a controller that works in cooperation with processor 1004. Integrated circuit 1000 may also be used as an arbiter for arbitrating access to a shared resource in system 1002. In yet another example, integrated circuit 1000 may be configured as an interface between processor 1004 and one of the other components in system 1002.

Various technologies may be used to implement the integrated circuit 1000 in which the improved DSP processor architecture presented herein is implemented in accordance with the principles of the present invention. Moreover, this invention is applicable to both one-time-only programmable and reprogrammable devices.

Thus, it is seen that an improved DSP processor architecture has been presented. One skilled in the art will appreciate that the present invention may be practiced by other than the described embodiments, which are presented for purposes of illustration and not of limitation, and the present invention is limited only by the claims which follow.

What is claimed is:

1. A method for processing signals on a programmable logic device that includes a plurality of programmable logic regions, the method comprising:
    configuring at least one of the regions as word conditioning logic;
    configuring at least another one of the regions as a computation unit having an input, an output, and a critical path, wherein the computation unit is configured to propagate signals from the input to the output via the critical path without propagating the signals through the word conditioning logic;
    providing a datapath from the output of the computation unit to a storage destination, wherein signals on the datapath are propagated through the word conditioning logic; and
    configuring at least a further one of the regions as analysis logic.

2. The method defined in claim 1, further comprising:
    performing an analysis operation in the analysis logic in combination with a write operation to the storage destination.

3. The method defined in claim 1, further comprising:
    performing an analysis operation in the analysis logic in combination with a move operation to the storage destination.

4. The method defined in claim 1, wherein the analysis logic is configured to perform block floating point analysis.

5. The method defined in claim 1, further comprising:
    providing rounding logic in the word conditioning logic.

6. The method defined in claim 1, further comprising:
    providing saturation logic in the word conditioning logic.

7. The method defined in claim 1, further comprising:
    providing rounding logic and saturation logic in the word conditioning logic, wherein the rounding logic and the saturation logic are arranged in series.

8. The method defined in claim 7, further comprising:
    monitoring the signals in the computation unit using the saturation logic.

9. The method defined in claim 8, wherein the monitoring is performed by monitoring circuitry included in the saturation logic, wherein the monitoring circuitry is operated separately from and in parallel with the computation unit.

10. A programmable logic device, comprising:
   a computation unit having an input, an output, and a critical path, wherein the computation unit is configured to propagate signals received on the input to the output via the critical path without propagating the signals through word conditioning logic;
   a datapath configured to convey output signals from the computation unit to a storage destination, wherein the output signals on the datapath are propagated through word conditioning logic; and
   a second logic substructure containing analysis logic and having an associated input and an associated output, wherein the associated input of the second logic substructure is coupled to the datapath.

11. The device defined in claim 10, wherein the analysis logic contained in the second logic substructure is configured to perform block floating point analysis.

12. The device defined in claim 10, wherein the analysis logic contained in the second logic substructure is executable in combination with a write operation to the storage destination.

13. The device defined in claim 10, wherein the analysis logic contained in the second logic substructure is executable in combination with a move operation to the storage destination.

14. A printed circuit board on which is mounted the device defined in claim 10.

15. The printed circuit board defined in claim 14, further comprising:
   a board memory mounted on the printed circuit board and coupled to the device.

16. The printed circuit board defined in claim 14, further comprising:
   processing circuitry mounted on the printed circuit board and coupled to the device.

17. The device defined in claim 10, wherein the computation unit includes an arithmetic logic unit in the critical path, wherein the arithmetic logic unit does not include word conditioning logic.

18. The device defined in claim 10, wherein the computation unit includes an accumulator in the critical path, wherein the accumulator does not include word conditioning logic.

19. The device defined in claim 10, further comprising:
   a first logic substructure containing word conditioning logic and having an associated input and an associated output, wherein the associated input of the first logic substructure is coupled to the output of the computation unit and the associated output of the first logic substructure is coupled to the datapath.

20. The device defined in claim 19, wherein the word conditioning logic contained in the first logic substructure is configured to perform rounding and saturation operations.

21. The device defined in claim 10, further comprising:
   a plurality of memory circuits, wherein the storage destination is at least one of the plurality of memory circuits.

22. The device defined in claim 10, further comprising:
   a plurality of registers, wherein the storage destination is at least one of the plurality of registers.

23. A digital processing system, comprising:
   processing circuitry;
   a system memory coupled to said processing circuitry; and
   the device defined in claim 10 coupled to the processing circuitry and the system memory.

24. A programmable logic integrated circuit device including a plurality of programmable logic regions, the device comprising:
   a storage circuit;
   at least one region configured as a data conditioning and analysis circuit, wherein the data conditioning and analysis circuit comprises at least one word conditioning subcircuit and at least one analysis subcircuit, wherein the data conditioning and analysis circuit is configured to be programmably selectively operable in a plurality of alternative modes, wherein in a first mode, the word conditioning subcircuit is in operation, and wherein in a second mode, the analysis subcircuit is in operation;
   at least another region configured as a computation circuit having an input, an output, and a critical path, wherein the computation circuit is configured to propagate signals received on the input to the output via the critical path without propagating the signals through the data conditioning and analysis circuit, and wherein the computation circuit is programmably selectively configurable to perform at least one arithmetic operation on input data supplied from the storage circuit to produce output data; and
   a datapath configured to convey the output data from the computation circuit to the storage circuit, wherein the output data on the datapath are propagated through the data conditioning and analysis circuit.

25. The device defined in claim 24, wherein the data conditioning and analysis circuit comprises at least one word conditioning subcircuit and at least one analysis subcircuit.

26. A digital processing system, comprising:
   processing circuitry;
   a system memory coupled to said processing circuitry; and
   the device defined in claim 24 coupled to the processing circuitry and the system memory.

27. A printed circuit board on which is mounted the device defined in claim 24.

28. The printed circuit board defined in claim 27, further comprising:
   a board memory mounted on the printed circuit board and coupled to the device.

29. The printed circuit board defined in claim 27, further comprising:
   processing circuitry mounted on the printed circuit board and coupled to the device.

30. The device defined in claim 24, wherein the data conditioning and analysis circuit comprises at least one word conditioning subcircuit and at least one analysis subcircuit.

31. A programmable logic integrated circuit device including a plurality of programmable logic regions, the device comprising:
   a storage circuit;
   at least one region configured as a data conditioning and analysis circuit, wherein the data conditioning and analysis circuit comprises at least one word conditioning subcircuit and at least one analysis subcircuit, wherein the word conditioning subcircuit is configured to be operated in series with the analysis subcircuit;
   at least another region configured as a computation circuit having an input, an output, and a critical path, wherein the computation circuit is configured to propagate signals received on the input to the output via the critical path without propagating the signals through the data conditioning and analysis circuit, and wherein the computation circuit is programmably selectively configurable to perform at least one arithmetic operation on input data supplied from the storage circuit to produce output data; and a datapath configured to convey the output data from the computation circuit to the storage circuit, wherein the output data on the datapath are propagated through the data conditioning and analysis circuit.

32. The device defined in claim 31, wherein the conditioning and analysis circuit comprises at least one word conditioning subcircuit and at least one analysis subcircuit.

33. A programmable logic integrated circuit device including a plurality of programmable logic regions, the device comprising:

a storage circuit;

at least one region configured as a data conditioning and analysis circuit, wherein the data conditioning and analysis circuit comprises:

rounding logic;

saturation logic; and block floating point analysis logic;

at least another region configured as a computation circuit having an input, an output, and a critical path, wherein the computation circuit is configured to propagate signals received on the input to the output via the critical path without propagating the signals through the data conditioning and analysis circuit, and wherein the computation circuit is programmably selectively configurable to perform at least one arithmetic operation on input data supplied from the storage circuit to produce output data; and a datapath configured to convey the output data from the computation circuit to the storage circuit, wherein the output data on the datapath are propagated through the data conditioning and analysis circuit.

34. The device defined in claim 33, wherein the data conditioning and analysis circuit comprises at least one word conditioning subcircuit and at least one analysis subcircuit.

* * * * *